(12) United States Patent
Becerra et al.

(10) Patent No.: US 11,915,197 B2
(45) Date of Patent: Feb. 27, 2024

(54) SYSTEMS AND METHODS FOR PROGRAMMATICALLY WEIGHTING DISPARATE INPUTS TO OPTIMIZE A PREDICTIVE MODEL

(71) Applicant: ASSURANT, INC., New York, NY (US)

(72) Inventors: Manuel Becerra, Miami, FL (US); David Glenn McMillan, Atlanta, GA (US); Edward Gorman, York, PA (US); Gary McWilliams, Wayne, PA (US)

(73) Assignee: Assurant, Inc., New York, NY (US)

( * ) Notice: Subject to any disclaimer, the term of this patent is extended or adjusted under 35 U.S.C. 154(b) by 0 days.

(21) Appl. No.: 17/303,446

(22) Filed: May 28, 2021

(65) Prior Publication Data

US 2022/0122035 A1 Apr. 21, 2022

Related U.S. Application Data (63) Continuation of application No. 13/435,474, filed on Mar. 30, 2012, now abandoned.
(Continued)

(51) Int. Cl.
*G06Q 10/10* (2023.01)
*G06Q 10/20* (2023.01)
*G06Q 30/012* (2023.01)

(52) U.S. Cl.
CPC ............. *G06Q 10/10* (2013.01); *G06Q 10/20* (2013.01); *G06Q 30/012* (2013.01)

(58) Field of Classification Search
CPC ......... G06Q 30/01; G06Q 10/20; G06Q 10/10
See application file for complete search history.

(56) References Cited

U.S. PATENT DOCUMENTS 6,694,234 B2 * 2/2004 Lockwood ............. G06Q 50/30
701/31.5
7,451,355 B1 * 11/2008 Coatney .............. G06F 11/0727
714/42
(Continued)

FOREIGN PATENT DOCUMENTS

CN 101167057 A * 4/2008 ......... G06Q 10/0637
CN 101925919 A 12/2010
(Continued)

OTHER PUBLICATIONS

A. Wolf, "Extended-Service Upstarts Rewrite Warranty Model," TWICE, vol. 23, (15), pp. 22, Jul. 21, 2008 (Year: 2008).*
(Continued)

*Primary Examiner* — Gerardo Araque, Jr.
(74) *Attorney, Agent, or Firm* — Alston & Bird LLP (57) ABSTRACT

Provided are systems and methods for programmatically weighting disparate inputs to optimize a predictive model. The predictive model may generate component weighted values associated with each disparate input to facilitate programmatic combination of the disparate inputs, and an aggregated weighted value may be generated from the combined component weighted values. Aggregated weighted values may be generated for a plurality of input sets, each of which may be programmatically scored relative to the remaining input sets. In some embodiments, the predictive model and an associated engine may be packaged for instantiation and execution on a local terminal.

4 Claims, 4 Drawing Sheets

Related U.S. Application Data (60) Provisional application No. 61/470,073, filed on Mar. 31, 2011.

(56) References Cited

U.S. PATENT DOCUMENTS

| | | | | |
|---|---|---|---|---|
| 7,904,319 B1* | 3/2011 | Whear | ........... | G06Q 40/08 705/4 |
| 7,996,724 B1* | 8/2011 | Coatney | ........... | G11B 27/36 714/48 |
| 8,065,261 B2 | 11/2011 | Kellogg et al. | | |
| 8,108,250 B1* | 1/2012 | Moore | ........... | G06Q 10/10 705/7.42 |
| 8,200,527 B1 | 6/2012 | Thompson et al. | | |
| 8,408,459 B1* | 4/2013 | Alonzo | ........... | G06Q 10/08 235/385 |
| 8,738,309 B2* | 5/2014 | Bertness | ........... | B60L 58/18 320/112 |
| 9,000,934 B1* | 4/2015 | Gordin | ........... | G08B 13/22 340/669 |
| 2001/0034686 A1 | 10/2001 | Eder | | |
| 2002/0077867 A1 | 6/2002 | Gittins et al. | | |
| 2003/0033260 A1 | 2/2003 | Yashiro et al. | | |
| 2003/0055666 A1* | 3/2003 | Roddy | ........... | G07C 5/008 705/305 |
| 2003/0061104 A1 | 3/2003 | Thomson et al. | | |
| 2003/0154094 A1 | 8/2003 | Bredemeier et al. | | |
| 2003/0171958 A1 | 9/2003 | Funaki | | |
| 2003/0200135 A1 | 10/2003 | Wright | | |
| 2004/0006514 A1 | 1/2004 | Rogers et al. | | |
| 2004/0039593 A1 | 2/2004 | Eskandari | | |
| 2004/0073520 A1 | 4/2004 | Eskandari | | |
| 2004/0122697 A1 | 6/2004 | Becerra et al. | | |
| 2004/0138908 A1 | 7/2004 | Lowe et al. | | |
| 2004/0148181 A1 | 7/2004 | McKnight et al. | | |
| 2004/0172304 A1* | 9/2004 | Joao | ........... | G06Q 40/10 705/2 |
| 2004/0210258 A1* | 10/2004 | Chip Burton, Jr. | .... | G06Q 10/10 607/5 |
| 2005/0015273 A1 | 1/2005 | Iyer | | |
| 2005/0192858 A1* | 9/2005 | Mueller | ........... | G06Q 30/0202 705/305 |
| 2005/0273349 A1* | 12/2005 | Abedi | ........... | G06Q 10/10 705/302 |
| 2006/0069581 A1 | 3/2006 | Chien et al. | | |
| 2006/0111924 A1 | 5/2006 | Hollich et al. | | |
| 2006/0184379 A1 | 8/2006 | Tan et al. | | |
| 2006/0235611 A1* | 10/2006 | Deaton | ........... | G01C 15/00 701/491 |
| 2006/0287903 A1* | 12/2006 | Heard | ........... | G06Q 10/30 705/308 |
| 2007/0156675 A1* | 7/2007 | Dalton | ........... | G06Q 30/0601 707/999.005 |
| 2007/0265886 A1 | 11/2007 | Toyryla et al. | | |
| 2008/0040176 A1 | 2/2008 | Ehling | | |
| 2008/0065457 A1 | 3/2008 | Hundt et al. | | |
| 2008/0095441 A1 | 4/2008 | Rosskamm et al. | | |
| 2008/0097796 A1 | 4/2008 | Birchall | | |
| 2008/0127313 A1 | 5/2008 | Payne et al. | | |
| 2008/0177613 A1 | 7/2008 | Chan et al. | | |
| 2009/0043615 A1 | 2/2009 | Belhe et al. | | |
| 2009/0063202 A1 | 3/2009 | Becerra et al. | | |
| 2009/0157437 A1* | 6/2009 | Becerra | ........... | G06Q 40/08 705/4 |
| 2009/0187433 A1 | 7/2009 | Nudd | | |
| 2009/0195394 A1 | 8/2009 | Johnson et al. | | |
| 2009/0248434 A1 | 10/2009 | Pfeffer et al. | | |
| 2009/0292583 A1 | 11/2009 | Eilam et al. | | |
| 2010/0017263 A1 | 1/2010 | Zernik et al. | | |
| 2010/0042952 A1* | 2/2010 | Geesey | ........... | G06Q 50/30 715/851 |
| 2010/0145734 A1 | 6/2010 | Becerra et al. | | |
| 2010/0179837 A1 | 7/2010 | Artinger | | |
| 2011/0264594 A1 | 10/2011 | Govindaraju | | |
| 2011/0295756 A1 | 12/2011 | Drew et al. | | |
| 2012/0022938 A1 | 1/2012 | McNea et al. | | |
| 2012/0079100 A1* | 3/2012 | McIntyre | ........... | H04W 4/90 709/224 |
| 2012/0209643 A1 | 8/2012 | Drew et al. | | |
| 2012/0226620 A1 | 9/2012 | Junger et al. | | |
| 2012/0239581 A1* | 9/2012 | Mosher | ........... | G06Q 50/163 705/305 |
| 2014/0249865 A1 | 9/2014 | Ghani et al. | | |

FOREIGN PATENT DOCUMENTS

| | | | | |
|---|---|---|---|---|
| CN | 101996385 A | | 3/2011 | |
| JP | 2004-194247 A | | 7/2004 | |
| JP | 4038995 B2 | * | 1/2008 | |
| JP | 2008015548 A | * | 1/2008 | |
| JP | 2009517779 A | * | 4/2009 | |
| WO | 01/71606 A1 | | 9/2001 | |
| WO | 2002/063531 A2 | | 8/2002 | |
| WO | WO-2007038211 A2 | * | 4/2007 | ............ G06Q 30/00 |
| WO | 2010/082885 A1 | | 7/2010 | |

OTHER PUBLICATIONS

K. Sahyouni, R. C. Savaskan and M. S. Daskin, "The effect of lifetime buys on warranty repair operations," J. Oper. Res. Soc., vol. 61, (5), pp. 790-803, May 2010 (Year: 2010).*
T. Cote, "Computer repair prohibitive: [Final Edition]," The Ottawa Citizen, pp. F.9-F9, 2003 (Year: 2003).*
A. Connolly and M. Hartley, "The Warranty Dilemma: If You Can Afford a Little Extra Peace of Mind, Make Sure Any Accidental Damage is Covered; To Extend or Not to Extend?" The Sun, pp. C.1, 2008 (Year: 2008).*
Extended European Search Report for coresponding European Application No. 12712515.1 dated Mar. 16, 2015, 4 pages.
International Search Report; Written Opinion of the International Searching Authority; PCT/US2012/031347, dated Aug. 28, 2012.
Jackson, "Data Mining: A Conceptual Overview," Communications of the Association for Information Systems, 8, Jan. 1, 2002, pp. 267-296.
Office Action for Canadian Application No. 2,831,807 dated Jul. 16, 2015.
Office Action for Chinese Application No. 201280023092.4 dated Dec. 2, 2015.
Office Action for Japanese Application No. 2014-502819 dated Dec. 16, 2014.
PR Newswire, New York, Some Drivers to See Rates Fall 35 Percent or More as Liberty Mutual Delivers New Products and Services: discussing vehicle insurance plans offered by Liberty Mutual that include "Better Car Replacement" that provide the insured with the cash value of a model-year-newer vehicle, Nov. 17, 2007.
Taki, H. et al., A Case-Based Reasoning System Using Case Evaluation for Diagnosis Tasks, the Transactions of The Institute of Electrical Engineers of Japan, a Publication of Electronics, Information and Systems Society, vol. 120-C (Dec. 2000) 2046-2054.
U.S. Appl. No. 13/435,474, filed Mar. 30, 2012, 2012/0252403 A1, Abandoned.

* cited by examiner

SYSTEMS AND METHODS FOR PROGRAMMATICALLY WEIGHTING DISPARATE INPUTS TO OPTIMIZE A PREDICTIVE MODEL

CROSS-REFERENCE TO RELATED APPLICATIONS

This application is a continuation of and claims priority to U.S. application Ser. No. 13/435,474 (published as U.S. 2012/0252403), filed Mar. 30, 2012, which claims the benefit of and priority to U.S. Provisional Application Ser. No. 61/470,073, filed Mar. 31, 2011. The contents of each of the foregoing applications are incorporated herein by reference in their entireties.

BACKGROUND

Wireless device protection programs have long been offered to users of wireless communication devices (e.g., portable digital assistants (PDAs), mobile telephones, smart phones, and/or the like). These programs have evolved over the years such that fulfillment of claims, which used to involve simple repair or replacement at select locations, now includes more complex management of forward and reverse logistics companies that aid in provision of timely and cost effective fulfillment of claims. Wireless device programs have typically involved the payment of a premium by a user (or subscriber). The premium is typically an itemized charge on the subscriber's monthly airtime invoice. The premium is then forwarded to an insurance company, where a portion of the premium is held in reserve to pay future losses, while another portion is used to pay administrative expenses associated with managing the wireless device protection program.

The benefit that subscribers enjoy under wireless device protection programs typically includes the ability to receive a replacement device of like kind and quality within a relatively short period of time. The subscribers are often at some point within a two year or other contractually agreed to commitment period with their respective wireless providers. Thus, even if a subscriber loses use of his or her wireless device, the subscriber is still committed to paying for service over the remainder of the commitment period. The wireless device protection program therefore provides the subscriber with protection against the possibility of having to pay for wireless subscription services without having a device to access those services.

The wireless device protection programs come in the form of insurance and warranty programs. However, other legal embodiments for providing protection may also emerge in the future. The obligations of an entity that offers the program (e.g., an insurance or warranty company) are typically specified in the terms and conditions of a policy or contract. The terms and conditions typically specify the minimum standards for fulfilling a claim. The objectives of establishing the minimum standards may include controlling the cost of the program in order to make the protection affordable to subscribers. As an example, a wireless device protection program may include terms specifying that a broken device will be replaced with a device of like kind and quality, and that the replacement device may be a refurbished device. Refurbished devices are often a low cost solution to providing claims fulfillment. However, when refurbished devices are not available, the subscriber may actually receive a new device.

Customer satisfaction is a key component in managing an effective wireless device protection program. High customer satisfaction scores may result in higher take rates and lower adverse selection rates. The ability to limit adverse selection may also enable premiums and deductibles to be kept relatively low, so that subscribers can see the value in paying relatively low monthly premium charges to secure their investment. Since customer satisfaction is clearly important, it may be desirable to provide improved mechanisms of providing fulfillment of claims in a wireless device protection program in order to have an increased likelihood of maintaining or improving customer satisfaction.

BRIEF SUMMARY

A method, apparatus and computer program product are therefore provided to enable the provision of targeted fulfillment with respect to claims associated with a wireless device protection program. For example, some embodiments may provide a mechanism by which a claim against a wireless device protection program policy may trigger an upgrade option for the user. Some example embodiments may also enable the provision of a predictive usage model to automatically determine an optimal fulfillment option with respect to balancing the interests of the parties involved. Accordingly, targeted fulfillment decisions may be made in a manner that improves the likelihood of customer satisfaction while also providing for efficient and productive operation of the wireless device protection program.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

As indicated above, customer satisfaction is a key component to effectively managing a wireless device protection program. However, in addition to the customer (or subscriber) and the program provider (e.g., insurance or warranty company) benefiting from high customer satisfaction ratings, the wireless service provider is typically a third party benefactor. In this regard, subscribers that have a high level of customer satisfaction are much more likely to remain with the wireless service provider when it is time to renew their contract for wireless services. Thus, the wireless service provider also has an interest in maintaining a high level of satisfaction in relation to fulfillment of claims related to the wireless device protection program.

Wireless devices have become ubiquitous in modern society and are relied upon heavily by many subscribers for communication, entertainment, social activities, professional activities, and many other uses. Many subscribers have even canceled their land-line telephone services and use only their wireless device as a primary contact source. Providing prompt and satisfying claims fulfillment to these subscribers can be particularly important in relation to maintaining customer loyalty. However, there are a number of categories that play a role in service delivery relative to claim fulfillment. For example, the location of service delivery, the product choice and the speed of delivery all play significant roles in relation to claims fulfillment. Each of these categories has a corresponding range of costs associated with selecting certain ones of the various options available within each category. Those same options also have varying potentials with respect to positively impacting customer behavior and satisfaction. By balancing the cost versus benefit for the options available within these categories, claims fulfillment may be handled in a targeted manner to achieve the goals of the parties involved in the transaction, and in particular the subscriber and the service provider.

Example embodiments of the present invention provide for a mechanism by which to weigh the varying options that are available for claims fulfillment, and provide targeted fulfillment. Targeted fulfillment may take into account the unique situations, needs, behavioral characteristics and value impact to the subscriber and the service provider. Some example embodiments may employ a predictive model that includes predefined weighting factors for predicting likely outcomes and/or behaviors and incorporates risk determinations in order to provide recommended options for claims fulfillment that balance cost versus benefit. Some example embodiments may also incorporate device upgrades that are triggered by claims processing. Accordingly, some embodiments may give service providers and insurance providers with tools to make value judgments that may enable them to maximize customer satisfaction, while balancing cost and perhaps also other concerns.

Figure 1:
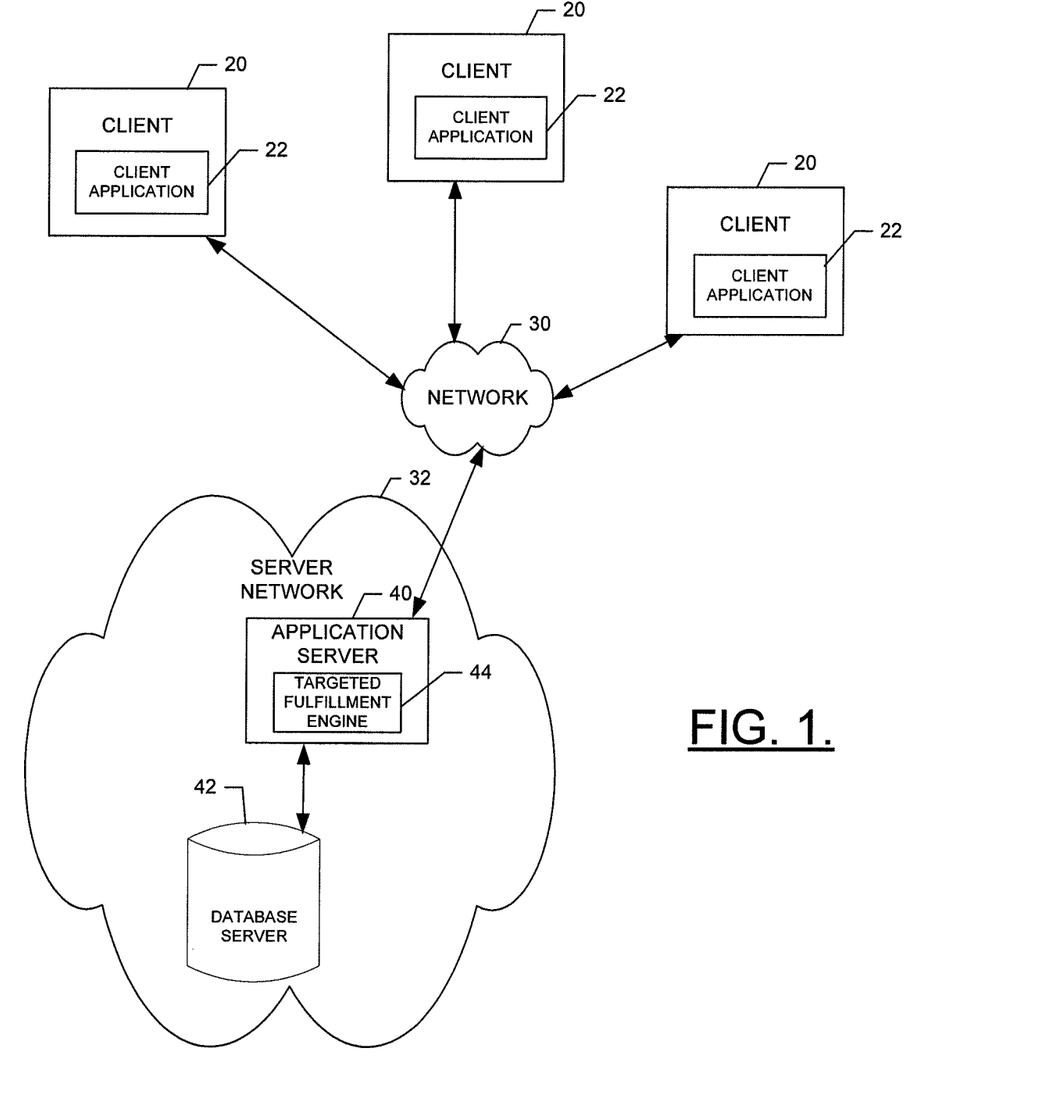
FIG. 1 is a block diagram illustrating a system for use in connection with providing targeted fulfillment with respect to claims associated with a wireless device protection program according to an example embodiment of the present invention.

An example embodiment of the invention will now be described in reference to FIG. 1, which illustrates an example system in which an embodiment of the present invention may be employed. As shown in FIG. 1, a system 10 according to an example embodiment may include one or more clients 20 that may, in some cases, be associated with different corresponding entities associated with claims processing. For example, among the clients 20, one or more clients may be associated with subscribers, one or more clients may be associated with service providers, and/or one or more clients may be associated with insurance providers (e.g., an insurance or warranty company). As such, the clients 20 may represent any terminal (mobile or fixed) computer or network access mechanism via which a claim may be reported. Thus, subscribers may, in some cases, be enabled to report claims directly via their own personal computers or communication devices. However, in cases where a subscriber prefers to or needs to submit a claim via a retail or other facility associated with the service provider, the subscriber may report the claim to the service provider and the service provider may utilize one of the clients 20 to enter the claim into the system 10. Similarly, in cases where the subscriber reports the claim to the insurance provider, the insurance provider may utilize one of the clients 20 to enter the claim into the system 10.

Each one of the clients 20 may be, for example, a computer (e.g., a personal computer, laptop computer, network access terminal, or the like) or may be another form of computing device (e.g., a PDA, cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information associated with targeted claims fulfillment according to an example embodiment. In some cases, the clients 20 may also receive a targeted fulfillment engine in the form of a deliverable component (e.g., as downloadable software to configure the client, or as a transferable memory device including instructions to configure the client). As such, for example, the client application 22 may include corresponding executable instructions for configuring the client 20 to provide corresponding functionalities as described in greater detail below.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) or databases. Communication between the network 30, the clients 20 and the devices or databases (e.g., servers) to which the clients 20 are coupled may be accomplished by either wireline or wireless communication mechanisms and corresponding protocols.

In an example embodiment, one of the devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of services associated with providing targeted fulfillment of claims received in connection with a wireless device protection program according to an example embodiment.

In some embodiments, for example, the application server 40 may therefore include an instance of targeted fulfillment engine 44 comprising stored instructions for handling activities associated with practicing example embodiments as described herein. As such, in some embodiments, the clients 20 may access the targeted fulfillment engine 44 online and utilize the services provided thereby. However, it should be appreciated that in other embodiments, the targeted fulfillment engine 44 may be provided from the application server 40 (e.g., via download over the network 30) to one or more of the clients 20 to enable recipient clients to instantiate an instance of the targeted fulfillment engine 44 for local operation. As yet another example, the targeted fulfillment engine 44 may be instantiated at one or more of the clients 20 responsive to downloading instructions from a removable or transferable memory device carrying instructions for instantiating the targeted fulfillment engine 44 at the corresponding one or more of the clients 20. In such an example, the network 30 may not be needed or utilized at all.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the targeted fulfillment engine 44 configured to operate in accordance with an example embodiment of the present invention. In this regard, for example, the targeted fulfillment engine 44 may include software for enabling the application server 40 to communicate with the network 30 and/or the clients 20 for the provision and/or receipt of information associated with performing targeted fulfillment as described herein. The memory (e.g., internal memory or the database server 42) may also or alternatively store modeling components (e.g., predictive model 80 of FIG. 2) to be used by the targeted fulfillment engine 44 for the performance of some example embodiments.

As such, the environment of FIG. 1 illustrates an example in which provision of targeted fulfillment of claims associated with a wireless device protection program may be accomplished by a particular entity (namely the targeted fulfillment engine 44 residing at the application server 40). However, it should be noted again that the targeted fulfillment engine 44 could alternatively handle provision of targeted fulfillment locally at one of the clients 20. Thus, in some embodiments, the targeted fulfillment engine 44 may be embodied at one or more of the clients 20 and, in such an example, the targeted fulfillment engine 44 may be configured to handle provision of targeted fulfillment services locally at the location at which the targeted fulfillment engine 44 is instantiated.

Figure 2:
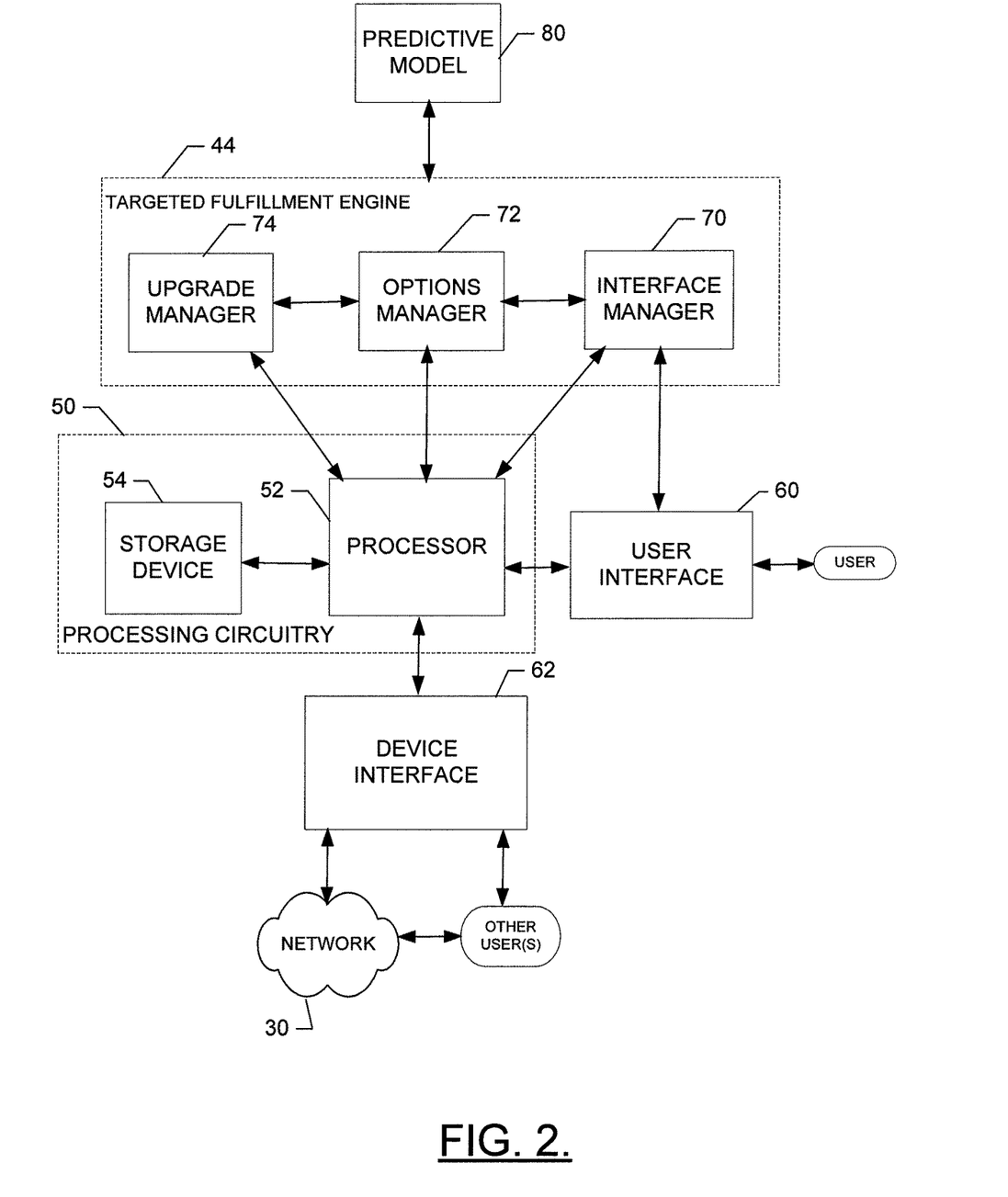
FIG. 2 is a block diagram showing various components that may be included in an apparatus for providing targeted fulfillment with respect to claims associated with a wireless device protection program according to an example embodiment of the present invention.

An example embodiment of the invention will now be described with reference to FIG. 2. FIG. 2 shows certain elements of an apparatus for provision of targeted fulfillment of claims associated with a wireless device protection program according to an example embodiment. The apparatus of FIG. 2 may be employed, for example, on a client (e.g., any of the clients 20 of FIG. 1) or a variety of other devices (such as, for example, a network device, server, proxy, or the like (e.g., the application server 40 of FIG. 1)). Alternatively, embodiments may be employed on a combination of devices. Accordingly, some embodiments of the present invention may be embodied wholly at a single device (e.g., the application server 40 or one or more clients 20) or by devices in a client/server relationship (e.g., the application server 40 and one or more clients 20). Furthermore, it should be noted that the devices or elements described below may not be mandatory and thus some may be omitted in certain embodiments.

Referring now to FIG. 2, an apparatus for provision of targeted fulfillment of claims associated with a wireless device protection program is provided. The apparatus may include or otherwise be in communication with processing circuitry 50 that is configured to perform data processing, application execution and other processing and management services according to an example embodiment of the present invention. In one embodiment, the processing circuitry 50 may include a processor 52 and a storage device 54. the processing circuitry 50 (and/or the processor 52) may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the clients 20) that may be in communication with the processing circuitry 50 via the device interface 62 and/or a network (e.g., network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application such as the targeted fulfillment engine 44) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the targeted fulfillment engine 44, which may include or otherwise control an interface manager 70, an options manager 72 and an upgrade manager 74. The interface manager 70, the options manager 72 and the upgrade manager 74 may each be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the interface manager 70, the options manager 72 and the upgrade manager 74, respectively, as described below.

The targeted fulfillment engine 44 may be a component of, or may itself be, a tool for managing decision making relative to claims processing, or managing the decision making relative to the presentation of user selectable options for claim fulfillment. As such, the targeted fulfillment engine 44 may be configured to provide an interface for inputting data, processing data and/or generating suggestions, fulfillment decisions, or fulfillment options in response to various claims that are received at the targeted fulfillment engine 44. The interface manager 70, the options manager 72 and the upgrade manager 74 may provide corresponding services associated with portions of the receiving, processing and generating tasks that are performed by the targeted fulfillment engine 44 as described in greater detail below.

In an example embodiment, the interface manager 70 may be configured to provide a structured organization of pages and/or interfaces to be presented to the user to represent corresponding input and output mechanisms for receiving data relating to claims processing and/or generating output information related to claims processing. Thus, for example, the interface manager 70 may be configured to present a sequence of topic segregated pages, fields, control consoles or other interface elements for the entry or viewing of data related to claims input, processing and/or handling. The interface manager 70 may therefore include pages with branding elements identifying the service provider and/or the insurance provider along with the corresponding text fields, menu options, or selectable input mechanisms for enabling a user to input data identifying claims information corresponding to a claim related to a policy protecting a specific wireless device. Thus, for example, the interface manager 70 may be configured to provide at least an ability for a subscriber to be identified, an identity (e.g., model number) of a device being protected to be identified, and/or a policy to be identified (e.g., defining terms and conditions for protecting a specific device or device of a specific subscriber). The interface manager 70 may also be configured to generate output data indicative of selectable fulfillment options or descriptive of the manner by which fulfillment of a claim is to be handled.

In some embodiments, the options manager 72 may be configured to utilize the claims information provided via the interface manager 70 to perform targeted fulfillment processing of the claim or claims associated with the claims information. As an initial matter, the options manager 72 may be configured to perform claims adjudication with respect to claims information submitted thereto. Thus, the options manager 72 may initially determine whether a particular claim relates to a covered event or not. If the claim relates to an event (or device) that is not covered, the options manager 72 may be configured to reject the claim and provide a corresponding message to that effect. However, if the claim relates to an event (or device) that is covered, the options manager 72 may be configured to weigh the various options available for fulfillment of the claim.

In an example embodiment, the options manager 72 may be configured to reference the predictive model 80 in order to perform claims information processing related to targeted fulfillment. The predictive model 80 may include a plurality of options for claim fulfillment, an indication of cost associated with each option, and a predictive assessment of the impact that each option may have on parties involved (e.g., the subscriber or customer and the service provider). Generally speaking, the claim fulfillment options may cover categories such as how a device provided to fulfill a claim (e.g., repaired or replaced) will be delivered to the subscriber, how the damaged device will be handled (e.g., will it be repaired or replaced), what type of replacement is to be provided, what type of shipping will be used, upgrade options, and/or the like. Thus, within each claim fulfillment option, a number of options are available within each category that forms a component of claim fulfillment (e.g., damage device surrender, repair or replacement, provision of repaired or replacement device to subscriber, etc.). In an example embodiment, the predictive model 80 may include weighted values associated with each claim fulfillment option that are comprised of component weighted values corresponding to the individual options in each corresponding category in order to indicate the cost of each claim fulfillment option as measured against some benefit corresponding to that claim fulfillment option. The weighted values may define a parametric valuation or even a monetized value to indicate a relative value of each option in relation to a specific party or a specific goal or consideration. Thus, for example, the weighted values may be descriptive of a cost and/or value to a particular entity (e.g., the service provider or the subscriber) or a value in terms of customer service scores or some other subjective criteria. A comparison, aggregation, or other consideration of the weighted values associated with claims fulfillment options may therefore be used to balance costs versus benefits for various options to determine options that are best for the parties associated with a claims transaction. The predictive model 80 may provide the data for use in considering the balance, and the options manager 72 may perform the processing to determine which options provide the best options.

In an example embodiment, the weighted values may be determined based on data gathered from claims fulfillment data, surveys, behavioral studies, research, or other sources. Sources for the data may include subscribers or customers, device manufacturers, service providers, application developers, Internet blogs, or even from devices themselves. In some cases, particular organizations (e.g., the service provider or insurance provider) may provide specific values for usage in connection with processing claims for their corresponding subscribers based on their own business goals and/or objectives. Some examples of options associated with certain categories are described below. However, it should be appreciated that the examples below are not limiting, and many other options may be included.

In this regard, a first option may be to either repair the device, or replace the device. Repair may typically be a cheaper option from the perspective of the insurance provider. However, replacement may be preferred by the subscriber. Replacement may be provided via a new device of like capability or a refurbished device of the same model or like capability. The potential benefit to be gained by improving customer satisfaction may have some value to both the insurance provider and the service provider in terms of continued engagement with the customer or expanded services. The predictive model 80 may therefore include statistical information indicating a weighted value (e.g., a parametric valuation or even a monetized value) to be assigned to account for the cost of repairing the covered device and account for the cost of replacing the covered device. If repair is desired, in some cases, the covered device may be enabled to be repaired via return to a retail location, via in person deposit of the covered device with a repair or service location, or via shipping the device from the subscriber to a repair facility or third party logistics provider. Each of these options may also have a corresponding component of a weighted value associated therewith based on the cost associated with pursuing each respective option. If replacement is desired, the covered device may be replaced with either a refurbished device of the same model, or with a device of like kind. The replacement may be obtained via the same mechanisms mentioned above in relation to repairing devices (e.g., retail outlet exchange, repair location exchange, ship to third party logistics center or ship to repair facility). Again, each option may have a corresponding component of a weighted value associated therewith.

The replacement or repair of a device may include a temporary replacement option such as the provision of a loaner device prior to arrival of the replacement device or while the device is being repaired. When replacement is to be accomplished via a refurbished device or new device being provided, the type of the refurbished or new device may be evaluated based on a cost relative to that of the device being replaced. If the refurbished or new device is an upgrade, the weighted value associated with the refurbished or new device may be descriptive of a difference in value between the damaged and replacement devices. Thus, for example, if the same make and model are available, the weighted value component considering device cost may be low or even zero, and if the make and model of the refurbished or replacement device represents an upgrade, the weighted value may increase proportional to or at least based on the incremental increase in functionality provided by the refurbished or replacement device.

Shipment options for refurbished or new devices may also be included among the options considered by the options manager 72 and may be a component of the weighted value associated with a particular fulfillment option. In this regard, use of regular mail, which likely takes longer, may have relatively low cost and therefore a corresponding weighted value indicative of the low cost. However, expedited delivery to the subscriber may cost more and have a corresponding weighted value indicative of that cost. In some cases, where the user is to pick up the device at a retail, repair or other designated location after a specified time, a corresponding weighted value indicative of the cost of that delivery mode may also be assigned.

In some embodiments, the predictive model 80 may also define predictive outcomes for various actions. For example, the predictive model 80 may define a likelihood of a subscriber expanding services used in response to a specific model of phone being provided to the user (either generally, or relative to a specific prior model). Other predictions may also be provided with respect to any number of possible positive or negative outcomes that may result from the options recorded in the predictive model 80. Thus, in some cases, the weighted value of any particular option may include a balance of cost versus relative benefit associated with a predictive outcome defined for a corresponding option. Weighted values accounting for costs associated with a particular option may be offset by a value associated with a positive outcome that may be likely to be caused by providing the corresponding option. However, in other cases, the weighted value may only represent cost and another value may represent the benefits or likelihood of a positive outcome and the corresponding values may be balanced against each other for option selection determinations made by the options manager 72.

In some embodiments, as indicated above, the options available for claim fulfillment may include upgrade options where a new device or refurbished device has improved functionality relative to the device being replaced. In situations where a covered device is no longer in stock or is perhaps considered obsolete, it may not be possible to replace the covered device with a device having the same level of functionality. In those cases, replacement of the covered device with a device having improved or increased functionality is inevitable and the subscriber may be provided with the improved device without such provision being considered to be an "upgrade" under the terms of replacement, even though one might consider the device to be a technically upgraded device, since the device is the closest thing to being of like kind that is available. However, in any situation where a device of similar functionality is available for provision to fulfill a claim, and a device having improved functionality is also available, the provision of the device having improved functionality may be considered to be an upgrade option.

In an example embodiment, the upgrade manager 74, which may in some cases be a portion of the options manager 72, may be configured to analyze upgrade options and determine, based on weighted values associated with each option, and also based on service provider and/or insurance provider upgrade policy criteria, whether to present an upgrade option to a subscriber, or whether to award an upgrade option to the subscriber, based on consideration of the claims information relative to the predictive model 80. As such, the upgrade manager 74 may consider the weighted values associated with options for replacing a covered device, and may also consider customer valuation data that may be used in upgrade policy criteria provided for a corresponding service provider and/or insurance provider.

As indicated above, customer satisfaction may be of value to both the insurance provider and/or the service provider. Furthermore, behavioral data indicates that subscribers may be more likely to extend their contract if they receive an upgraded device near the end of their contract period. Accordingly, for example, the options manager 72 may include weighted values associated with considering the potential value to the service provider in connection with different upgrade options. The service provider may therefore be willing to subsidize (totally or in part) the cost of one or more upgrade options for which the subscriber may qualify. The service provider may provide input, or rely on standard data, as to the weighted values or parametric valuations that should be applied to certain subscriber characteristics. Some examples of characteristics that may be considered include account size, average revenue per user (ARPU), contract life remaining, persistency probability, cost of fulfilling a claim in a corresponding way (as determined by the options manager 72), predicted impact of each option for fulfillment relative to future claims, and predicted impact of each option for fulfillment relative to future subscriber behavior in relation to ARPU, persistency, expanded services, number of devices covered, number of devices associated with the account, etc. The account size may consider the number of users or services bundled in connection with the account. The ARPU measures the average revenue of each user on an account based on their monthly billing amount. ARPU is a key performance indicator (KPI) measured by wireless providers. The contract life remaining may indicate the time remaining on the contractual commitment between the subscriber and the service provider. Persistency probability may define a prediction as to how likely the customer is to remain with the service provider.

Accordingly, some example embodiments may employ the targeted fulfillment engine 44 to assess circumstances associated with a claim, service delivery options for satisfying a claim, costs associated with each option, predicted or most likely impacts that each option may have on future user behavior, and the other issues mentioned above in order to find one or more options that are best suited to satisfy the interests of all parties. In some cases, a best option (e.g., an option having a highest score or value) for claim fulfillment based on the application of the predictive model 80 may be selected as the option to be used for claim fulfillment. As such, the options manager 72 of the targeted fulfillment engine 44 may internally analyze the options available and their corresponding advantages and disadvantages (e.g., benefits and costs) and generate a best option as the option to be pursued. However, in some alternative embodiments, the targeted fulfillment engine 44 may select from among the highest scoring options and present the selected options to the subscriber. These selected options may represent a ranked listing of the top options for fulfilling a claim. Each option that is presented to the user may indicate any costs to be borne by the user in association with user selection of the corresponding option, along with a description of benefits associated with the corresponding option and any modifications to terms and conditions of the user's current commitment. Thus, in this example, the options manager 72 may actually select multiple options to be presented to the subscriber in order to allow the subscriber to review the presented options and select a preferred option. In each case, determinations as to a best option, or multiple best options, may be made based on comparing relative costs of each fulfillment option to a value of a corresponding predicted outcome associated with the respective fulfillment options.

The options manager 72 may also be configured to track or monitor the impact that each fulfillment option that is selected has on future fulfillment options (e.g., if a particular replacement model is depleted, the corresponding model will be eliminated as a future options for fulfillment of other claims). Thus, in some example embodiments, the options manager 72 may be integrated into an inventory management system so that device inventory levels are known with respect to candidates for fulfillment of claims as refurbished or replacement devices. In some cases, the options manager 72 may also be integrated into a demand planning system. Thus, for example, an algorithm may be applied to determine average daily demand for a particular model and predict future availability of new and refurbished devices of a corresponding make and model to utilize the information for determining fulfillment alternatives for particular claims.

As indicated above, certain options may include upgrade options. The upgrade options may be fulfillment options that would give the user increased functionality over that which could be provided in a replacement or refurbishment option given the standard of providing a device of like capability. In an example embodiment, an upgrade option may be selectable by the subscriber in exchange for some additional contribution being made by the subscriber. The additional contribution may be extending the subscribers commitment to the service provider, providing a cash contribution, agreeing to purchase additional services, and/or the like. Additional contribution may also be used to enhance other aspects of the claims fulfillment process beyond the device itself. For example, the subscriber may provide an additional contribution in order to receive faster delivery.

In some embodiments, additional contribution may be provided by the service provider (e.g., the wireless carrier) or another third party. The service provider may provide the additional contribution to give the subscriber an option to upgrade their device or services by providing a cash contribution to add to the value of a fulfillment option that is to be presented to the subscriber. Other third parties may add cash contributions to increase the value of a fulfillment option that is to be presented to a subscriber. These benefits may be offered, for example, in exchange for advertising or a commitment to use third party services. As such, in various example embodiments, different benefactors may exist with respect to the options provided.

In an example embodiment, the benefactor of gross value to be generated from a preferred fulfillment option may be different from the entity that will pay the total cost or incremental cost of a particular claim fulfillment option. In such an example, a net value for each fulfillment option from the benefactor's perspective, and an incremental cost to be paid by the benefactor to the entity that incurs the incremental cost of each option may be calculated (e.g., by the options manager 72). Fulfillment options may then be ranked based on their score or value from the benefactor's perspective. Once a fulfillment option is applied, the incremental cost may be calculated, accumulated and billed to the defined benefactor.

In some example embodiments, the benefactor may be the wireless service provider. In such an example, the typical fulfillment option may include providing a customer with a refurbished replacement device via two day shipping. The cost of overnight delivery may create an incremental fulfillment cost increase for the event. By shipping overnight, however, the predicted impact to the customer may be an increase in the average spend that the customer is likely to engage in by an amount greater than the incremental fulfillment cost. The options manager 72 may be configured to apply business rules to establish that the service provider agrees to pick up any incremental fulfillment cost increases where the corresponding benefit to the wireless service provider is expected to be higher than the incremental fulfillment cost. Thus, the options manager 72 in this example may determine that the best option for fulfilling the claim is to select overnight shipping, calculate the incremental cost and bill it to the benefactor.

As indicated above, the device itself may form the source for provision of some information used in making targeted fulfillment decisions. In some cases, user activity with respect to the device (e.g., usage patterns or habits) may be reported to the options manager 72 and the options manager 72 may be configured to evaluate the usage patterns or habits of the subscriber relative to known usage patterns that impact the degradation of the subscriber's device. If there is incompatibility between the subscriber's habits and the impacts of those habits on the life of the device model of the subscriber, a business rule may be provided to influence the fulfillment option to include replacement of the subscriber's device with a different device model that is more tolerant of the subscriber's usage patterns or habits.

The options manager 72 of some embodiments may operate responsive to submission of claims information. However, in some example cases, the options manager 72 may be configured to pre-calculate options for one or more subscribers prior to the submission of a claim. Thus, there may be pre-stored or predetermined options selections available with respect to each (or at least some) subscribers in order to reduce computation times later on when a claim is initiated. When claims information is submitted, the options manager 72 may utilize the data submitted during filing of the claim to modify the predetermined options and provide updated targeted fulfillment solutions or options for the subscriber.

In another example embodiment, a targeted outcome may be defined to achieve an overall service level objective while providing differentiated time to deliver options to various customer groups. As an example, consumers having a certain demographic may be selected to receive different levels of service in relation to delivery or other services based on a consumer value score or other rating of the consumer. Thus, for example, certain consumers may be selected to receive replacement devices in an expeditious manner with overnight delivery, or even same day fulfillment at service locations based on their consumer value score.

In another example embodiment, consumers may be selected for a subsidized upgrade when they have met a minimum requirement of their contract term. As such, for example, the consumer may receive value from their wireless device protection program in the form of a credit on an approved claim that can be applied to an amount not covered by the wireless service provider's subsidy on a new make or model of device. In order for the consumer to elect this option, the consumer may need to meet the service provider's requirements with respect to agreeing to a new term commitment. Many other example scenarios can also be supported by example embodiments.

Thus, example embodiments may provide a flexible way to incorporate upgrade options into claim fulfillment decisions and also to provide a statistical basis for balancing cost versus benefit decisions in relation to fulfilling claims. Thus, the cheapest cost option may not always be selected for claims fulfillment, but instead the option, regardless of cost, that provides the greatest overall benefit to the parties involved.

In some example embodiments, weighted values that may be associated with fulfillment options may comprise signed (e.g., positive or negative) values that may be defined on the basis of claim conditions. Accordingly, a fulfillment option may be evaluated on the basis of claim conditions such that the weighted values corresponding to the claim conditions may be added or subtracted from a baseline value (e.g., 0, 100, or any other value) such that a fulfillment option may be scored and evaluated.

As a hypothetical example, a decision whether to fulfill a claim by providing a customer with a new device or a refurbished device may be based on a fulfillment option having weighted values defined in terms of the following claim conditions:

Claim Profile: First claim=0; second claim=−5, third or more claims=−15

Loss Type: Lost=−5; stolen=−3; accidental damage=0, mechanical breakdown=+3

Days insured: 1-90 days=0; 91-180 days=−2; 181-360 days=−5; 361-720 days=+2; 721+ days=+5

Probability to Churn: 0-50%=0; 51-75%=+5; 76-100%=+10

Fulfillment Cost: $0-$150=0; $151-$225=−4; $226-$350=−6; $351+=−10

In this hypothetical example, each component may have a weighted value toward a total value scored based on the likelihood that the customer will be more satisfied by receiving a new device.

As a further hypothetical example, a decision whether to offer a device upgrade option may be based on a fulfillment option having weighted values defined in terms of the following claim conditions:

Current Contract Term: expires within 3 months=+15; expires from 4-6 months=+5; expires beyond 7 months=0

Average Revenue per User: $0-$50=−6; $51-$100=0; $101-$150=+3; $151+=+9

Fulfillment Cost: $0-$150=0; $151-$225=−4; $226-$350=−6; $351+=−10

Financial Contributions: Carrier contributes up to $100=+10; carrier contributes over $100=+20; customer contributes up to $50=+10; customer contributes over $50=+15

In this hypothetical example, each component may have a weighted value toward a total value score based on the likelihood the customer will remain an active subscriber of the wireless carrier by receiving an upgrade offer.

In a further hypothetical example, a decision as to which of two fulfillment options related to upgrading a device attendant to fulfilling a claim my include two upgrade options having weighted values defined in terms of the following claim conditions:

Option 1:
  Current Contract Term: expires within 3 months=+5; expires from 4-6 months=0; expires beyond 7 months=−5
  Average Revenue per User: $0-$50=−6; $51-$100=0; $101-$150=+3; $151+=+9
  Fulfillment Cost: $0-$150=0; $151-$225=−4; $226-$350=−6; $351+=−10
  Financial Contributions: Carrier contributes up to $100=+4; carrier contributes between $101-$200=+7; carrier contributes over $200=+10; customer contributes up to $50=+3; customer contributes between $51-$100=+7; customer contributes over $100=+10

Option 2:
  Current Contract Term: expires within 3 months=+10; expires from 4-6 months=+5; expires beyond 7 months=0.
  Average Revenue per User: $0-$50=−6; $51-$100=0; $101-$150=+5; $151+=+12.
  Fulfillment Cost: $0-$150=3; $151-$225=0; $226-$350=−2; $351+=−5.
  Financial Contributions: Carrier contributes up to $100=+4; carrier contributes over $100=+15; customer contributes up to $50=+5; customer contributes over $50=+10.
  Customer satisfaction: previous customer survey score higher than 90%=+5

In still a further hypothetical example, a decision as to which fulfillment options including upgrades to offer a customer as options which the customer may select may include an evaluation of the following three upgrade options having weighted values defined in terms of the following claim conditions:

Option 1:
  Probability to Churn: 0-50%=0; 51-75%=+5; 76-100%=+10
  Financial Contributions: Carrier does not contribute=0; customer does not contribute=0

Option 2:
  Probability to Churn: 0-50%=0; 51-75%=+5; 76-100%=+10
  Financial Contributions: Carrier contributes up to $100=+10; carrier contributes over $100=+15; customer does not contribute=0

Option 3:
  Probability to Churn: 0-50%=0; 51-75%=+5; 76-100%=+10
  Financial Contributions: Carrier contributes up to $100=+10; carrier contributes over $100=+15; customer contributes up to $100=+10; customer contributes more than $100=+15

Figure 3:
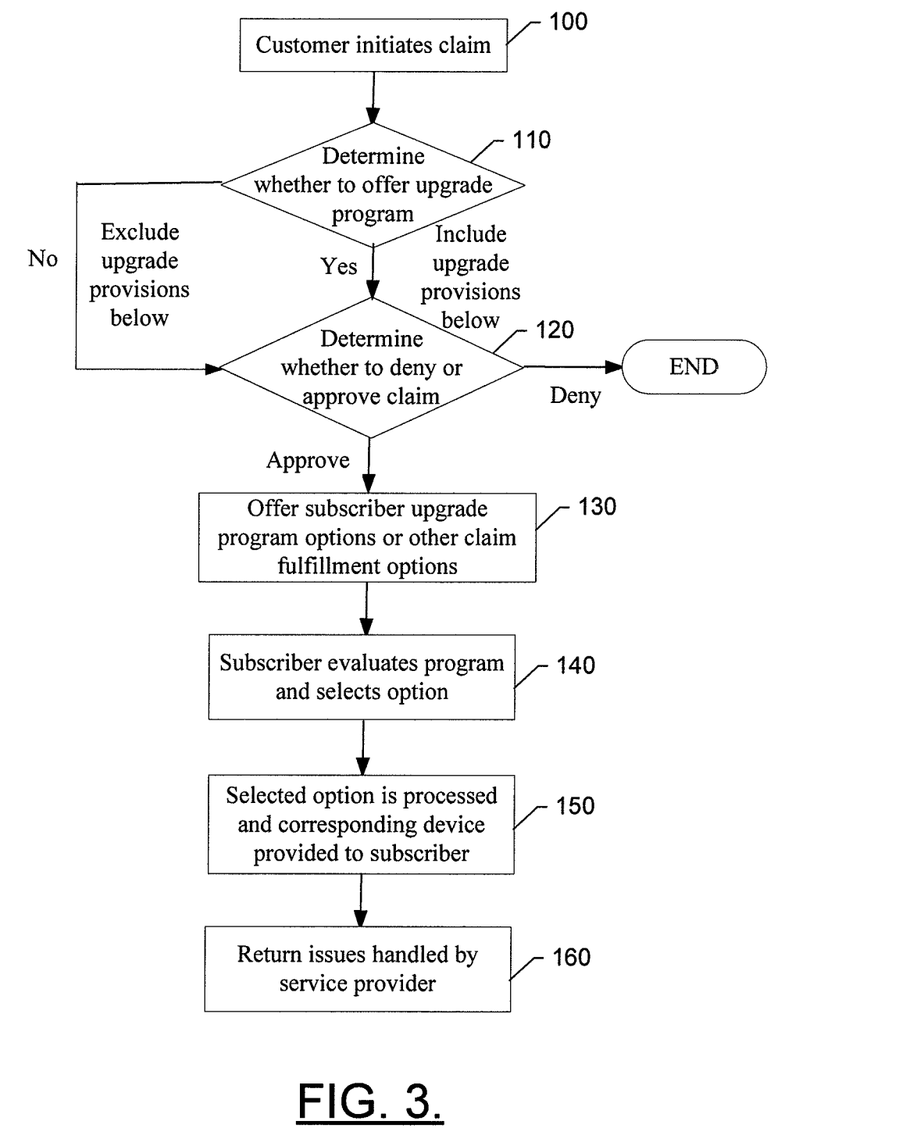
FIG. 3 illustrates an example flow diagram showing a targeted fulfillment flow process according to an example embodiment of the present invention.

FIG. 3 illustrates an example flow diagram illustrating a targeted fulfillment flow process according to an example embodiment. As shown in FIG. 3, a customer may initiate a claim at operation 100. The claim may be initiated by a subscriber either online, by phone or in person and the claim may be entered into a system similar to that of FIG. 1. A determination may be made at operation 110 as to whether an upgrade program will be offered. A claims decision (e.g., approved or denied) may then be made at operation 120. Assuming the claim is approved, the subscriber may be offered upgrade program options or other claim fulfillment options along with an explanation of terms and conditions applicable if the offered program is accepted at operation 130. The subscriber may then evaluate the program and decide whether or not to participate and select an option at operation 140. If the subscriber chooses an upgrade option or other option, the selected option may then be processed and a corresponding device fulfilling the claim in accordance with the selected option will be provided to the user via a manner consistent with the accepted option at operation 150. If there are any return issues or other service issues, they may be handled by the service provider at operation 160.

Figure 4:
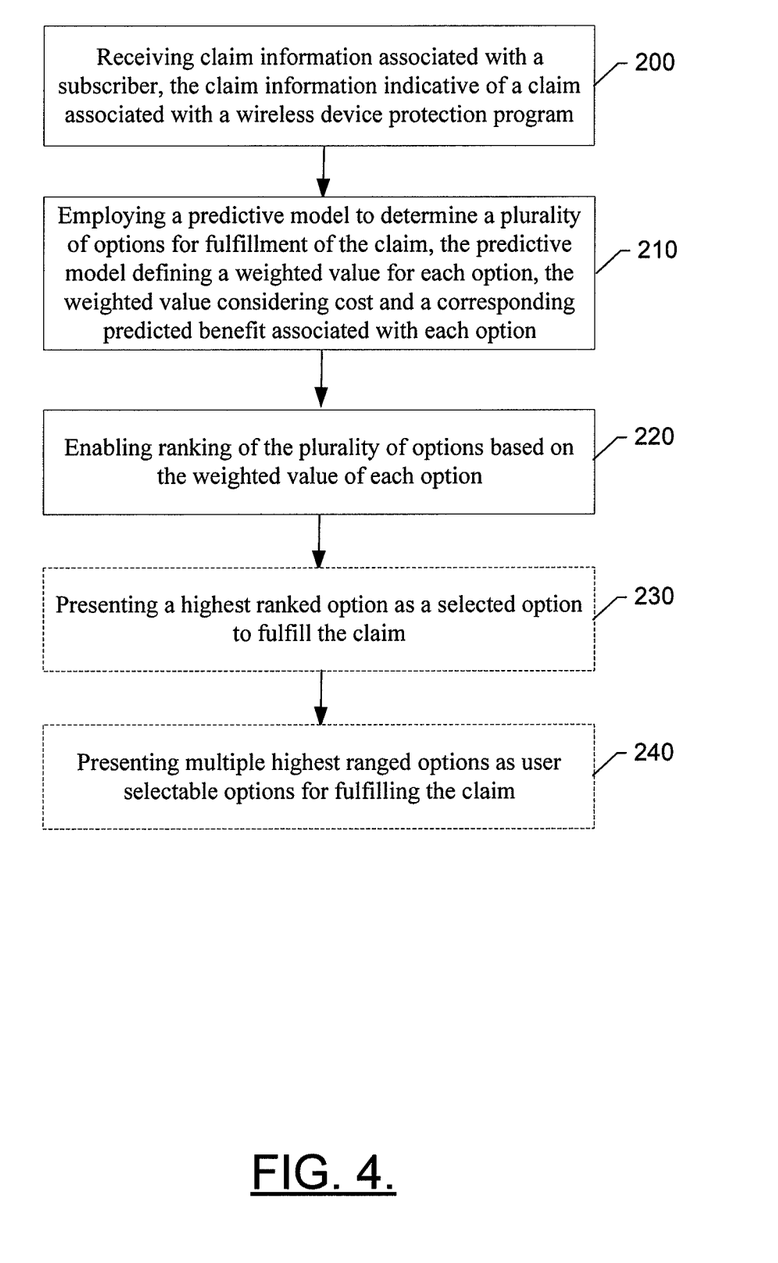
FIG. 4 is a block diagram according to an example method for providing targeted fulfillment with respect to claims associated with a wireless device protection program according to an example embodiment of the present invention.

Embodiments of the present invention may therefore be practiced using an apparatus such as the one depicted in FIG. 2. However, other embodiments may be practiced in connection with a computer program product for performing embodiments of the present invention. FIG. 4 is a flowchart of a method and program product according to example embodiments of the invention. Each block or step of the flowchart of FIG. 4, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., storage device 54) and executed by processing circuitry (e.g., processor 52).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s). These computer program instructions may also be stored in a non-transitory computer-readable storage medium comprising memory that may direct a computer or other programmable apparatus to function in a particular manner, such that the instructions stored in the computer-readable memory produce an article of manufacture including instructions to implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

In this regard, a method according to one embodiment of the invention, as shown in FIG. 4, may include receiving claim information associated with a subscriber, the claim information indicative of a claim associated with a wireless device protection program at operation 200, employing a predictive model to determine a plurality of options for fulfillment of the claim, the predictive model defining a weighted value for each option where the weighted value considers cost and a corresponding predicted benefit associated with each option at operation 210, and enabling ranking of the plurality of options based on the weighted value of each option at operation 220.

In some cases, the method may include additional optional operations (some examples of which are shown in dashed lines in FIG. 4). Any additional operations, and/or modifications to the operations above or the additional operations, may be performed in addition to the operations described above in any order and in any combination. Thus, in some embodiments, all of the additional operations or modifications may be practiced, while in others none of the additional operations or modifications may be practiced. In still other embodiments, any combination of less than all of the additional operations or modifications may be practiced. In an example embodiment, the method may further include presenting a highest ranked option as a selected option to fulfill the claim at operation 230. Alternatively or additionally, the method may include presenting multiple highest ranged options as user selectable options for fulfilling the claim at operation 240. In some embodiments, various modifications to the above or other optional operations may be included in any combination and in any order with respect to the operations 200-240 described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    generating a transmittable deliverable component comprising a targeted fulfillment engine;
    causing, via computer executable download instructions, a first plurality of mobile devices to each download a respective copy of the transmittable deliverable component comprising the targeted fulfillment engine to instantiate the targeted fulfillment engine locally on each respective mobile device of the first plurality of mobile devices, wherein each targeted fulfillment engine comprises a predictive model;
    generating, via each respective mobile device of the first plurality of mobile devices, usage pattern data associated with the respective mobile devices of the first plurality of mobile devices including first usage pattern data for a first mobile device of the first plurality of mobile devices and second usage pattern data for a second mobile device of the first plurality of mobile devices, wherein the usage pattern data comprises user activity data captured on each respective mobile device of the first plurality of mobile devices;
    automatically inputting, via the transmittable deliverable component, each of the usage pattern data for each respective mobile device into the predictive model of the targeted fulfillment engine instantiated locally on the respective mobile devices of the first plurality of mobile devices;
    gathering second usage pattern data associated with a second plurality of mobile devices, the second usage pattern data defining known usage patterns;
    for each respective mobile device of the first plurality of mobile devices, generating a unique output of the predictive model associated with the usage pattern data for each respective mobile device by comparing the usage pattern data for each respective mobile device with the second usage pattern data defining the known usage patterns to determine a degradation information associated with the respective mobile device including a first degradation information associated with the first mobile device and a second degradation information associated with the second mobile device, wherein at least a portion of the unique outputs are generated locally without network access;
    receiving claim information associated with a subscriber associated with the first mobile device, the claim information indicative of a claim associated with a wireless device protection program;
    detecting a mechanical breakdown or accidental damage of the first mobile device of the first plurality of mobile devices;
    employing, via processing circuitry, the predictive model to determine a plurality of options for fulfillment of the claim, the predictive model defining a weighted value for each option, wherein the plurality of options comprises an upgrade resolution;
    programmatically generating the upgrade resolution for resolving the mechanical breakdown or accidental damage, wherein programmatically generating the upgrade resolution comprises detecting an incompatibility in the first degradation information comprising an incompatibility between the first usage pattern data and a life status of the first mobile device based on a device model of the first mobile device;
    presenting, to a first user of the first mobile device, the upgrade resolution based on the incompatibility associated with the first mobile device;
    receiving a selection, via an interface, of the upgrade resolution;
    receiving second claim information associated with a second subscriber associated with the second mobile device of the first plurality of mobile devices;
    detecting a second mechanical breakdown or second accidental damage of the second mobile device of the first plurality of mobile devices;
    programmatically generating a second resolution for resolving the second mechanical breakdown or second accidental damage, wherein the second resolution comprises instructions to issue a first refurbished mobile device to the second subscriber based on a compatibility of the second usage pattern data and a life status of the first refurbished mobile device;
    presenting, to a second user of the second mobile device, the second resolution associated with the second mobile device and the first refurbished mobile device;
    receiving a second selection, via a second interface, of the second resolution;
    fulfill the upgrade resolution for the first user based on the selection; and
    fulfill the second resolution for the second user based on the second selection.

2. The method of claim 1, further comprising:
    determining, based at least in part on the weighted value of each of the plurality of options, a best option for fulfillment of the claim; and
    automatically selecting the best option to use for fulfillment of the claim, wherein the best option comprises the upgrade resolution.

3. A system comprising one or more processing circuitries configured to cause the system to at least:

generate a transmittable deliverable component comprising a targeted fulfillment engine;

cause, via computer executable download instructions, a first plurality of mobile devices to each download a respective copy of the transmittable deliverable component comprising the targeted fulfillment engine to instantiate the targeted fulfillment engine locally on each respective mobile device of the first plurality of mobile devices, wherein each targeted fulfillment engine comprises a predictive model;

generate, via each respective mobile device of the first plurality of mobile devices, usage pattern data associated with the respective mobile devices of the first plurality of mobile devices including first usage pattern data for a first mobile device of the first plurality of mobile devices and second usage pattern data for a second mobile device of the first plurality of mobile devices, wherein the usage pattern data comprises user activity data captured on each respective mobile device of the first plurality of mobile devices;

automatically input, via the transmittable deliverable component, each of the usage pattern data for each respective mobile device into the predictive model of the targeted fulfillment engine instantiated locally on the respective mobile devices of the first plurality of mobile devices;

gather second usage pattern data associated with a second plurality of mobile devices, the second usage pattern data defining known usage patterns;

for each respective mobile device of the first plurality of mobile devices, generate, via processing circuitry on the respective mobile devices, a unique output of the predictive model associated with the usage pattern data for each respective mobile device by comparing the usage pattern data for each respective mobile device with the second usage pattern data defining the known usage patterns to determine a degradation information associated with the respective mobile device including a first degradation information associated with the first mobile device and a second degradation information associated with the second mobile device, wherein at least a portion of the unique outputs are generated locally without network access;

receive claim information associated with a subscriber associated with the first mobile device, the claim information indicative of a claim associated with a wireless device protection program;

detect a mechanical breakdown or accidental damage of the first mobile device of the first plurality of mobile devices;

employ the predictive model to determine a plurality of options for fulfillment of the claim, the predictive model defining a weighted value for each option, wherein the plurality of options comprises an upgrade resolution;

programmatically generate the upgrade resolution for resolving the mechanical breakdown or accidental damage, wherein programmatically generating the upgrade resolution comprises detecting an incompatibility in the first degradation information comprising an incompatibility between the first usage pattern data and a life status of the first mobile device based on a device model of the first mobile device;

present, to a first user of the first mobile device, the upgrade resolution based on the incompatibility associated with the first mobile device;

receive a selection, via an interface, of the upgrade resolution;

receive second claim information associated with a second subscriber associated with the second mobile device of the first plurality of devices;

detect a second mechanical breakdown or second accidental damage of the second mobile device of the first plurality of mobile devices;

programmatically generate a second resolution for resolving the second mechanical breakdown or second accidental damage, wherein the second resolution comprises instructions to issue a first refurbished mobile device to the second subscriber based on a compatibility of the second usage pattern data and a life status of the first refurbished mobile device;

present, to a second user of the second mobile device, the second resolution associated with the second mobile device and first refurbished mobile device;

receive a second selection, via a second interface, of the second resolution;

fulfill the upgrade resolution for the first user based on the selection; and fulfill the second resolution for the second user based on the second selection.

4. The system of claim 3, wherein the one or more processing circuitries are further configured to cause the system to:

determine, based at least in part on the weighted value of each of the plurality of options, a best option for fulfillment of the claim; and automatically select the best option to use for fulfillment of the claim, wherein the best option comprises the upgrade resolution.

* * * * *

UNITED STATES PATENT AND TRADEMARK OFFICE
CERTIFICATE OF CORRECTION

PATENT NO. : 11,915,197 B2
APPLICATION NO. : 17/303446
DATED : February 27, 2024
INVENTOR(S) : Becerra et al.

Page 1 of 1

It is certified that error appears in the above-identified patent and that said Letters Patent is hereby corrected as shown below:

In the Claims

Column 20,
Line 34, Claim 3, "and first" should read --and the first--.

Signed and Sealed this
Fifteenth Day of October, 2024

Katherine Kelly Vidal
*Director of the United States Patent and Trademark Office*